United States Patent
Yi et al.

(10) Patent No.: US 8,983,681 B2
(45) Date of Patent: Mar. 17, 2015

(54) METHOD OF COMMUNICATING WITH A VEHICLE HAVING A TELEMATICS UNIT

(75) Inventors: Ki Hak Yi, Windsor (CA); Kenneth L. Peirce, Grosse Pointe Farms, MI (US); David George, Sterling Heights, MI (US)

(73) Assignee: General Motors LLC, Detroit, MI (US)

( * ) Notice: Subject to any disclaimer, the term of this patent is extended or adjusted under 35 U.S.C. 154(b) by 513 days.

(21) Appl. No.: 13/267,167

(22) Filed: Oct. 6, 2011

(65) Prior Publication Data

US 2013/0090782 A1    Apr. 11, 2013

(51) Int. Cl.
| | | |
|---|---|---|
| G05D 1/00 | (2006.01) | |
| H04M 3/42 | (2006.01) | |
| H04W 76/02 | (2009.01) | |
| H04M 3/51 | (2006.01) | |
| H04L 29/06 | (2006.01) | |
| H04W 4/12 | (2009.01) | |
| H04W 12/00 | (2009.01) | |
| H04L 12/58 | (2006.01) | |
| H04L 29/08 | (2006.01) | |

(52) U.S. Cl.
CPC .......... *H04M 3/42348* (2013.01); *H04W 76/02* (2013.01); *H04M 3/42382* (2013.01); *H04M 3/51* (2013.01); *H04L 69/22* (2013.01); *H04L 69/28* (2013.01); *H04L 69/164* (2013.01); *H04W 4/12* (2013.01); *H04W 12/00* (2013.01); *H04L 51/18* (2013.01); *H04L 63/0272* (2013.01); *H04L 67/34* (2013.01); *H04L 67/12* (2013.01)
USPC ................... 701/2; 701/36; 370/328

(58) Field of Classification Search
CPC ....... H04L 69/22; H04L 69/28; H04L 69/164; H04L 63/0272; H04L 67/34; H04L 67/12; H04L 51/18; H04W 4/00; H04W 4/04; H04W 4/046; H04W 76/02; H04W 12/00; H04W 4/12; H04M 3/42348; H04M 3/42382; H04M 3/51
USPC ......................................... 701/2, 36; 370/328
See application file for complete search history.

(56) References Cited

U.S. PATENT DOCUMENTS

| | | | |
|---|---|---|---|
| 8,514,825 B1* | 8/2013 | Addepalli et al. ............ | 370/338 |
| 8,560,609 B2* | 10/2013 | Nathanson .................... | 709/204 |
| 2003/0190030 A1* | 10/2003 | Alton ............................ | 379/219 |
| 2007/0142990 A1* | 6/2007 | Moughler et al. ............. | 701/50 |
| 2011/0234427 A1* | 9/2011 | Ingram et al. ............. | 340/995.1 |
| 2014/0036922 A1* | 2/2014 | Yousefi et al. ................ | 370/392 |

FOREIGN PATENT DOCUMENTS

| | | |
|---|---|---|
| CN | 1481631 A | 3/2004 |
| CN | 101857028 A | 10/2010 |

* cited by examiner

*Primary Examiner* — Gertrude Arthur Jeanglaude
(74) *Attorney, Agent, or Firm* — Anthony Luke Simon; Reising Ethington P.C.

(57) ABSTRACT

A system and method for communicating between a vehicle having a vehicle telematics unit and a central facility includes establishing a virtual private network (VPN) connection between a vehicle and a central facility; constructing a data message for communication between the vehicle and the central facility using the VPN; transmitting the data message via the VPN using an unreliable transmission protocol; and determining if the transmitted data message arrived at its destination.

20 Claims, 2 Drawing Sheets

METHOD OF COMMUNICATING WITH A VEHICLE HAVING A TELEMATICS UNIT

TECHNICAL FIELD

The present invention relates generally to vehicles and more particularly to a method of communicating with a vehicle having a telematics unit.

BACKGROUND OF THE INVENTION

Central facilities carry out a wide variety of voice and/or data communications with vehicles. These transmissions can be voice communications between a live advisor at the central facility and a vehicle occupant. And these transmissions can also include exchanging data between the central facility and the vehicle. Sometimes, this exchange involves a vehicle that automatically sends data or other information to the central facility. Other times, the central facility may want to ask the vehicle to send it data. In that case, the central facility can send a message to the vehicle (or many vehicles) with a data request. However, these data requests should be sent in such a way that the recipient(s) can be reasonably certain of the sender's identity. Given that central facilities often service a large number of vehicles at the same time in a secure way, it can be challenging to economically and securely send communications to a number vehicles; the wireless transmission cost of doing so can be significant. It would be helpful to wirelessly communicate with vehicles at a reduced cost while maintaining a secure mechanism of carrying out such communications.

SUMMARY OF THE INVENTION

According to an aspect of the invention, there is provided a method of communicating between a vehicle having a vehicle telematics unit and a central facility. The method includes establishing a virtual private network (VPN) connection between a vehicle and a central facility; constructing a data message for communication between the vehicle and the central facility using the VPN; transmitting the data message via the VPN using an unreliable transmission protocol; and determining if the transmitted data message arrived at its destination.

According to another aspect of the invention, there is provided a method of communicating between a vehicle having a vehicle telematics unit and a central facility. The method includes constructing a message at a central facility that includes a computer-readable instruction for a vehicle telematics unit; establishing a virtual private network (VPN) connection between the central facility and the vehicle telematics unit for transmitting the message, wherein the VPN is at least partially established by a wireless carrier system; transmitting the message via the established VPN from the central facility to the vehicle telematics unit using a user datagram protocol (UDP).

According to yet another aspect of the invention, there is provided a method of communicating between a vehicle having a vehicle telematics unit and a central facility. The method includes instructing a vehicle to telephone a central facility only if the vehicle receives data messages sent using a user datagram protocol (UDP) and ignore data messages received in formats other than UDP; constructing a data message at the central facility that instructs a vehicle telematics unit of the vehicle to contact the central facility; transmitting the data message using a virtual private network (VPN) connection between the central facility and a vehicle; and determining if the data message arrived at its destination by comparing an amount of time between the message transmission and receiving a communication from the vehicle with a predetermined threshold.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described below facilitates communications between a vehicle carrying a vehicle telematics unit and a central facility. These communications can be carried out over a virtual private network (VPN) using messages sent via a user datagram protocol (UDP). Using the VPN, messages constructed in accordance with the UDP can be securely sent as packetized data from the central facility to the vehicle telematics unit. By using the UDP, the overall amount of data transmitted as part of communications between vehicles and central facilities can be reduced. And by using the VPN, communications sent using UDP can simultaneously be sent securely.

Presently, many messages exchanged between the vehicle and the central facility are sent as short-message service (SMS) messages. The SMS messages are often circuit-switched (virtually or otherwise) and involve a relatively complex and/or costly combination of telephony equipment to send. This is especially true when the number of SMS messages is large, as can be the case with fleets of vehicles. As a result, the use of UDP messages to carry the payloads often carried by SMS messages can increase the speed of transmission while simultaneously decreasing the cost. Upon receiving the UDP, the vehicle telematics unit can extract its payload and use the payload much like would be done upon receiving an SMS message.

Figure 1:
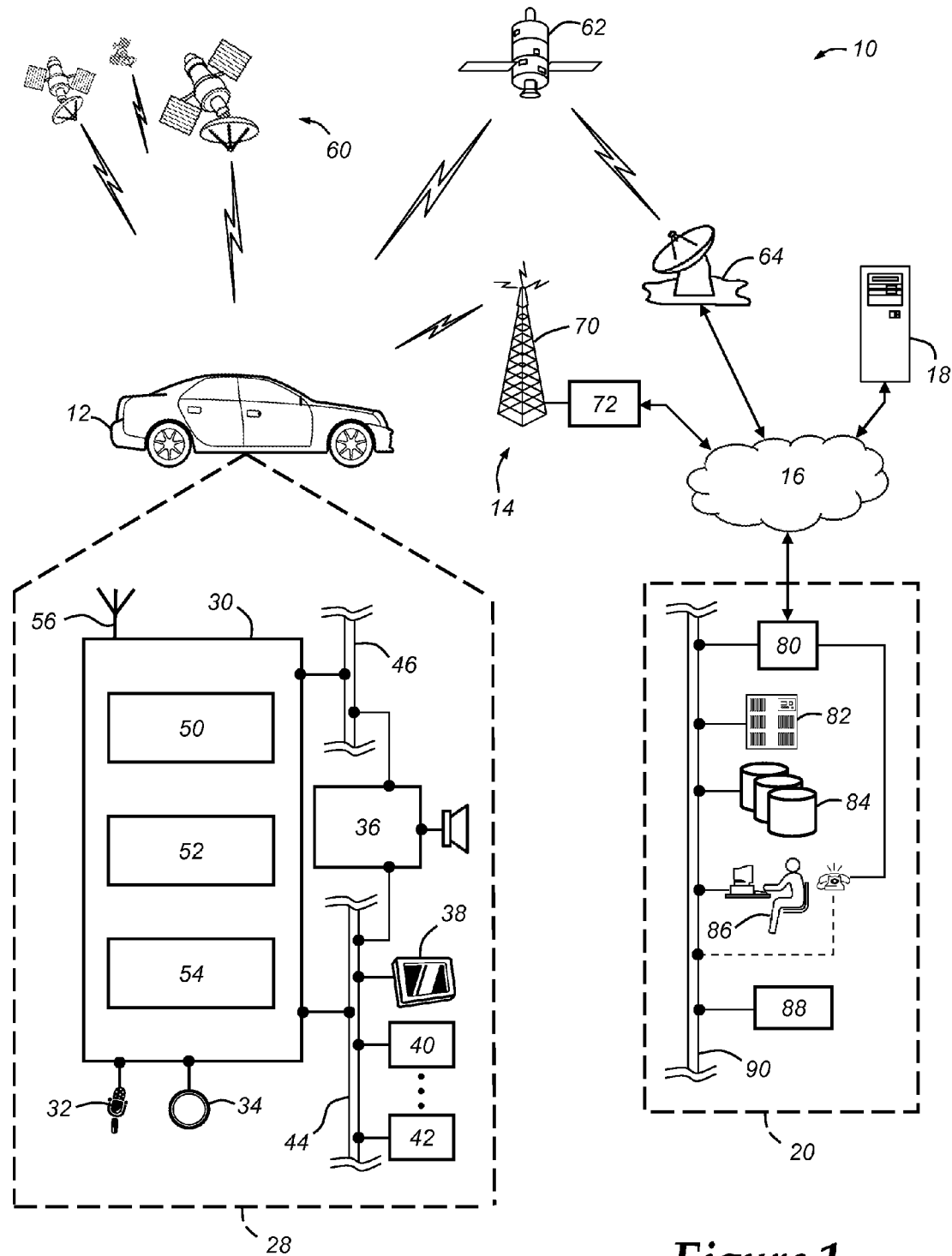
FIG. 1 is a block diagram depicting an exemplary embodiment of a communications system that is capable of using the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000 and 3GPP LTE) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
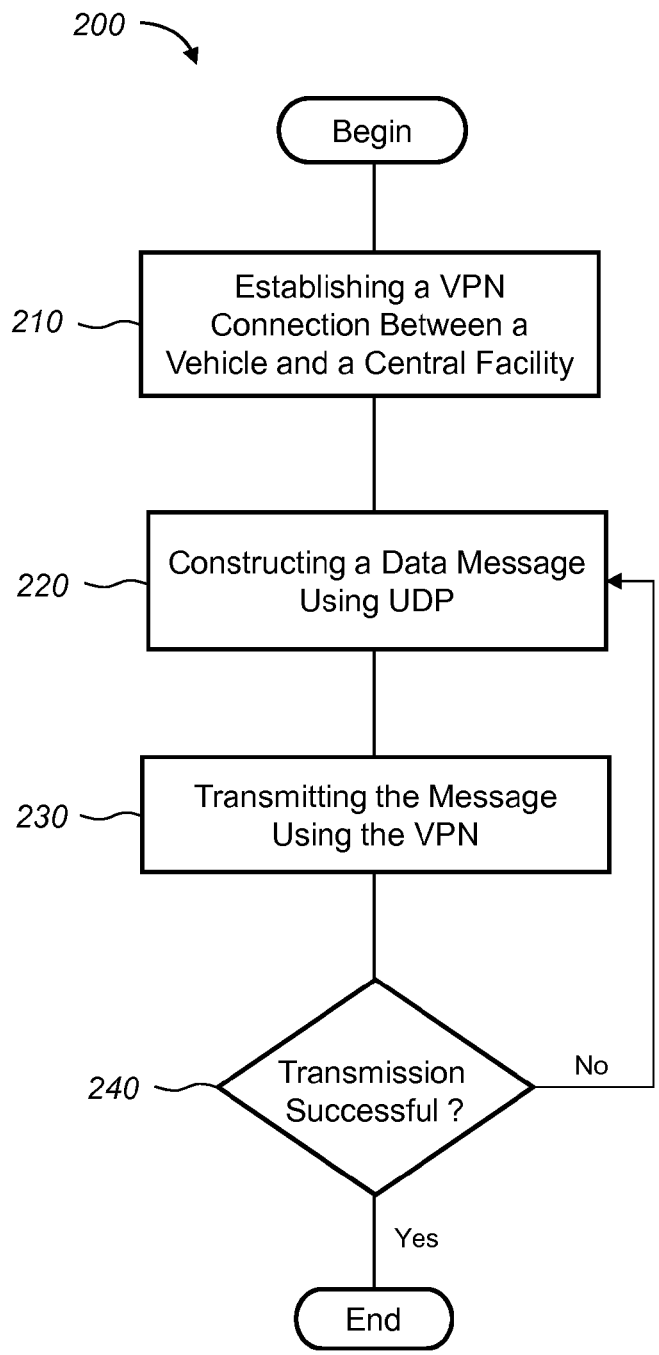
FIG. 2 is a flow chart of a method of communicating between a vehicle having a vehicle telematics unit and a central facility.

Turning now to FIG. 2, there is shown a method 200 of communicating between the vehicle 12 having vehicle telematics unit 30 and a central facility. The method 200 begins at step 210 by establishing a virtual private network (VPN) connection between the vehicle 12 and a central facility. For example, the central facility can be the call center 20 described above. While other implementations are possible, the following description involves carrying out the method 200 using the call center 20.

The VPN connection can be a way of using unsecured public communication infrastructure as a conduit to securely transmit information between two entities. A number of ways to establish the VPN exist and can use any one of several tunneling protocols. For example, the VPN can be established using a secure shell tunnel or transport layer security (TLS) protocol through which unencrypted data can be sent through an encrypted passage. Each of these protocols can use an encryption key scheme in which the vehicle telematics unit 30 and the call center 20 each possess one or more keys for encrypting and decoding communications between them. The key encryption scheme can be symmetrical, in which the vehicle telematics unit 30 and the call center 20 can use a private key to encrypt and decrypt communications. Or the system of key encryption can be asymmetrical, in which the vehicle telematics unit 30 and the call center 20 each have a unique set of one public key and one private key. In some cases, the VPN can be at least partially set up or carried out by the wireless carrier system 14. However, it is possible that the VPN can be set up without assistance from the wireless carrier system 14. In implementations in which the wireless carrier system 14 establishes the VPN, it can maintain a tunnel between the vehicle telematics unit 30 and the call center 20. This can be a secure transmission connection that can be used by the call center 20 to contact one or more vehicles 12 with unencrypted data. In other implementations, the wireless carrier system 14 may not establish the VPN. Despite this, the VPN can be established between the vehicle telematics unit 30 and the call center 20 even if the vehicle telematics unit 30 may be communicating with what may be a "roaming" wireless carrier system 14. When the vehicle telematics unit 30 communicates via the roaming wireless carrier system 14, the tunnel can be established using the symmetrical/asymmetrical encryption schemes discussed above. The method proceeds to step 220.

At step 220, a data message is constructed for communication between the vehicle 12 and the call center 20. As part of providing service to the vehicle 12, the call center 20 may contact the vehicle 12 for a variety of reasons, such as requesting vehicle data for vehicle diagnostics or to instruct the vehicle 12 to download software updates—to highlight just two examples. In doing so, the call center 20 can initially contact the vehicle 12 and instruct the vehicle 12 to take some action. In this implementation, the vehicle telematics unit 30 can be instructed to contact the call center 20 based on the data message. The data message can include a payload that instructs the vehicle telematics unit 30 to contact the call center 20; this type of action may be referred to as a "shoulder tap." While the method 200 will be described with respect to the "shoulder tap" command, it is also possible that the data message can include other instructions besides those commanding the vehicle 12 to contact the call center 20. The payload could have been originally intended for inclusion with an SMS message to the vehicle. But instead, the payload can be encapsulated as datagrams that are part of a data message sent using user datagram protocol (UDP).

UDP can be described as a protocol used to carry out a portion of the Internet Protocol (IP) suite. Along with transmission control protocol (TCP), UDP is a protocol that may be used on the transport layer of the IP suite. Both UDP and TCP involve packetized data that can be sent between two entities each having an IP address. These protocols may be viewed differently from the use of other communication methods, such as SMS messages, which may use circuit switching along its communication path. In additional, distinctions can be made between UDP and TCP. For instance, data sent using UDP can be viewed as "unreliable" such that the sender may not receive any confirmation regarding the delivery of transmitted data, whereas TCP is a "reliable" protocol. However, the message size of data sent using UDP can be significantly less than the message size of other protocols, such as TCP, and messages sent via SMS. Nonetheless, it should be appreciated, that TCP can also be used to implement at least part of the present method 200 even though TCP messages may be larger than those sent using UDP. The method 200 proceeds to step 230.

At step 230, the data message is transmitted using the VPN connection between the call center 20 and the vehicle 12. Using the VPN, the data message can be transmitted securely through the VPN using UDP. The data message can originate at the call center 20 and travel through the land network 16 and wireless carrier system 14 to the vehicle telematics unit 30. In this implementation, it is possible that the call center 20 and the vehicle telematics unit 30 each may use an IP address and using those IP addresses can maintain a communications link through the VPN so long as the vehicle telematics unit 30 is registered with a base station, such as cell tower 70, of the wireless carrier system 14. As noted above, messages sent using UDP can carry out their purpose using file sizes that can be smaller than TCP or other protocols. In an exemplary implementation, the data messages sent using UDP over the VPN can be less than one kilobyte (K) in size.

A scheme of transmitting communications from the call center 20 to the vehicle telematics unit 30 using UDP can also be used to implement a firewall or similar type of gateway at the vehicle 12. This firewall can prevent processing of unwanted messages sent to the vehicle 12. The vehicle 12 may be instructed to contact the call center 20 only if the vehicle 12 receives data messages sent using UDP. This instruction can be programmed into the vehicle telematics unit 30 at the time the vehicle 12 is manufactured. Or it is also possible to wirelessly program the vehicle telematics unit 30 with this instruction using over-the-air provisioning (OTAP). For example, the vehicle telematics unit 30 can be programmed identify the type of message sent to the vehicle 12, such as TCP messages, SMS messages, or UDP messages. The vehicle telematics unit 30 can then be instructed to disregard all messages that are not sent using UDP. Thus, any SMS messages received by the vehicle telematics unit 30 can be easily disregarded without elaborate processing or decision making carried out at the vehicle 12. In effect, this instruction may be used as a simple and robust firewall that prevents the vehicle telematics unit 30 from devoting computing resources to the processing of unwanted SMS messages. Other implementations of this concept exist. The vehicle telematics unit 30 can also be programmed to identify not only the type of message (e.g. UDP) but also identify a particular format of the message. That way messages sent using UDP in a unique format can be identified by the vehicle telematics unit 30 as messages to process while all other messages can be ignored.

Given that the data message sent using UDP may be described as an "unreliable" communications method, the call center 20 can use a timer to monitor the probability of successful transmission. The call center 20 can activate the timer upon transmitting the data message to the vehicle telematics unit 30. That way, even though the UDP protocol may lack an inherent confirmation that the data message has been delivered, the call center 20 can still determine with reasonable certainty whether the data message has been delivered. The method 200 proceeds to step 240.

At step 240, a determination is made whether the transmitted data message arrived at its destination. This can be determined by comparing an amount of time that passes between the message transmission at step 230 and a time at which a communication is received from the vehicle 12 with a predetermined threshold. After sending the data message to the vehicle 12, the call center 20 can expect to receive a response to the data message or the instruction within the payload of the data message within a determined amount of time. In the example discussed above with regard to the "shoulder tap," the call center 20 can expect the vehicle telematics unit 30 to contact the call center 20 within a determined amount of time. The call center 20 can adjust this amount of time to make it smaller or larger depending on a number of factors, such as time of day, network traffic, etc. If the call center 20 fails to receive a response to the data message within the determined amount of time, the method can return to step 220 and another data message can be constructed and sent to the call center 20. Otherwise, the method 200 then ends.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of communicating between a vehicle having a vehicle telematics unit and a central facility, comprising the steps of:
    (a) establishing a virtual private network (VPN) connection between a vehicle and a central facility;
    (b) constructing a data message for communication between the vehicle and the central facility using the VPN;
    (c) transmitting the data message via the VPN using an unreliable transmission protocol;
    (d) comparing an amount of time that passes between transmitting the data message via the VPN using the unreliable transmission protocol and receiving a response from the vehicle with a predetermined threshold; and
    (e) determining if the transmitted data message arrived at its destination based on the comparison in step (d).

2. The method of claim 1, further comprising the step of transmitting the data message using the VPN, wherein the VPN is established by a wireless carrier system.

3. The method of claim 1, further comprising the step of establishing the VPN over a roaming wireless carrier system.

4. The method of claim 1, wherein the unreliable transmission protocol is a user datagram protocol (UDP).

5. The method of claim 1, wherein the central facility is a call center and the data message includes a computer-readable instruction that commands the vehicle to call the call center.

6. The method of claim 1, further comprising the step of instructing the vehicle to: telephone the central facility only if the vehicle receives data messages sent using a user datagram protocol (UDP) and ignore data messages received in formats other than UDP.

7. The method of claim 6, wherein the step of instructing the vehicle is carried out by a vehicle manufacturer.

8. The method of claim 1, wherein step (d) further comprises the step comparing an amount of time between the message transmission in step (c) and the receipt of a call from the vehicle with a predetermined threshold.

9. The method of claim 1, further comprising the step of obtaining an internet protocol (IP) address assigned to the vehicle for transmitting the data message.

10. The method of claim 1, further comprising the step of initiating a call at the vehicle to the central facility in response to receiving the transmitted message.

11. The method of claim 1, further comprising the steps of:
    encrypting the data message at the central facility; and
    decrypting the data message at the vehicle.

12. A method of communicating between a vehicle having a vehicle telematics unit and a central facility, comprising the steps of:
    (a) constructing a message at a central facility that includes a computer-readable instruction for a vehicle telematics unit;
    (b) establishing a virtual private network (VPN) connection between the central facility and the vehicle telematics unit for transmitting the message, wherein the VPN is at least partially established by a wireless carrier system;
    (c) transmitting the message via the established VPN from the central facility to the vehicle telematics unit using a user datagram protocol (UDP);
    (d) comparing an amount of time that passes between transmitting the data message via the VPN using UDP and receiving a response from the vehicle with a predetermined threshold; and
    (e) determining if the transmitted data message arrived at its destination based on the comparison in step (d).

13. The method of claim 12, further comprising the step of establishing the VPN over a roaming wireless carrier system.

14. The method of claim 12, wherein the central facility is a call center and the computer-readable instruction commands the vehicle telematics unit to call the central facility.

15. The method of claim 12, further comprising the step of instructing the vehicle telematics unit to: telephone the central facility only if the vehicle telematics unit receives data messages sent using the user datagram protocol UDP and ignore data messages received in formats other than UDP.

16. The method of claim 12, further comprising the step of determining if the transmitted message arrived at the vehicle telematics unit by comparing an amount of time between the message transmission in step (c) and message arrival at the vehicle telematics unit with a predetermined threshold.

17. The method of claim 12, further comprising the step of obtaining an internet protocol (IP) address assigned to the vehicle telematics unit for transmitting the message.

18. The method of claim 12, further comprising the step of initiating a call at the vehicle telematics unit to the central facility in response to executing the computer-readable instruction included with the transmitted message.

19. The method of claim 12, further comprising the steps of:
    encrypting the data message at the central facility; and
    decrypting the data message at the vehicle.

20. A method of communicating between a vehicle having a vehicle telematics unit and a central facility, comprising the steps of:
    (a) instructing a vehicle to:
        (a1) contact a central facility only if the vehicle receives data messages sent using a user datagram protocol (UDP); and
        (a2) ignore data messages received in formats other than UDP;
    (b) constructing a data message at the central facility that instructs a vehicle telematics unit of the vehicle to contact the central facility;
    (c) transmitting the data message using a virtual private network (VPN) connection between the central facility and a vehicle; and
    (d) determining if the data message arrived at its destination by comparing an amount of time between the message transmission in step (c) and receiving a communication from the vehicle with a predetermined threshold.

* * * * *